United States Patent
DeHaan et al.

(10) Patent No.: US 8,566,459 B2
(45) Date of Patent: Oct. 22, 2013

(54) SYSTEMS AND METHODS FOR INTEGRATED CONSOLE MANAGEMENT INTERFACE

(75) Inventors: Michael P. DeHaan, Morrisville, NC (US); William F. Peck, Douglas, MA (US)

(73) Assignee: Red Hat, Inc., Raleigh, NC (US)

( * ) Notice: Subject to any disclaimer, the term of this patent is extended or adjusted under 35 U.S.C. 154(b) by 536 days.

(21) Appl. No.: 12/475,214

(22) Filed: May 29, 2009

(65) Prior Publication Data

US 2010/0306334 A1  Dec. 2, 2010

(51) Int. Cl.
*G06F 15/16* (2006.01)

(52) U.S. Cl.
USPC .......................................... 709/228; 715/224

(58) Field of Classification Search
USPC ........................................................ 709/228
See application file for complete search history.

(56) References Cited

U.S. PATENT DOCUMENTS

| | | | |
|---|---|---|---|
| 5,386,466 A * | 1/1995 | Bales et al. .............. 379/221.06 |
| 6,154,128 A | 11/2000 | Wookey et al. |
| 6,263,455 B1 | 7/2001 | Bannister |
| 6,327,677 B1 | 12/2001 | Garg et al. |
| 6,529,784 B1 | 3/2003 | Cantos et al. |
| 6,611,869 B1 | 8/2003 | Eschelbeck et al. |
| 6,636,521 B1 | 10/2003 | Giulianelli |
| 6,721,880 B1 | 4/2004 | Pike |
| 6,915,457 B1 | 7/2005 | Miller |
| RE39,717 E | 7/2007 | Yates et al. |
| 7,373,553 B2 | 5/2008 | Tripp et al. |
| 7,441,021 B1 | 10/2008 | Perry |
| 7,478,152 B2 * | 1/2009 | Holt et al. ..................... 709/223 |
| 7,660,824 B2 | 2/2010 | Halpern et al. |
| 7,693,966 B2 | 4/2010 | Schmid |
| 7,739,308 B2 * | 6/2010 | Baffier et al. ................ 707/802 |
| 7,769,990 B1 | 8/2010 | Okcu et al. |
| 7,801,990 B2 * | 9/2010 | Anuff et al. ................... 709/225 |
| 7,856,496 B2 | 12/2010 | Kline |
| 7,865,578 B1 | 1/2011 | Gerraty |
| 7,953,764 B2 * | 5/2011 | Baffier et al. ................ 707/802 |
| 2002/0161873 A1 * | 10/2002 | McGuire ...................... 709/223 |
| 2002/0184349 A1 | 12/2002 | Manukyan |
| 2003/0055931 A1 | 3/2003 | Cravo De Almeida et al. |
| 2003/0061323 A1 | 3/2003 | East et al. |
| 2003/0120754 A1 | 6/2003 | Muto et al. |
| 2003/0177412 A1 | 9/2003 | Todd |
| 2003/0208589 A1 | 11/2003 | Yamamoto |
| 2004/0006546 A1 | 1/2004 | Wedlake et al. |
| 2004/0032625 A1 | 2/2004 | Yamano |
| 2004/0034577 A1 | 2/2004 | Van Hoose et al. |
| 2004/0198319 A1 | 10/2004 | Whelan et al. |

(Continued)

*Primary Examiner* — Tauqir Hussain
(74) *Attorney, Agent, or Firm* — Lowenstein Sandler LLP

(57) ABSTRACT

Embodiments relate to systems and methods for integrated console management in networks populated by a diverse set of console types. A set of managed machines, such as personal computers or other clients, servers, hosts, and/or other machines, can be managed by a network management platform. Different machines populating the managed network can be accessed or controlled by different types of network management consoles, or client interfaces for monitoring and controlling different sets of machines. The network management platform or other node can maintain a console management engine which interacts with the various console types connected or assigned to underlying target machines. The console management engine can maintain a console translation table which invokes particular interfaces, data formats, ports, and/or other parameters of specific console packages used for underlying sets of machines. The console management engine can thereby present a unified interface to systems administrators or other users.

14 Claims, 4 Drawing Sheets

(56) References Cited

U.S. PATENT DOCUMENTS

| | | |
|---|---|---|
| 2004/0230828 A1 | 11/2004 | DeFuria et al. |
| 2005/0066218 A1 | 3/2005 | Stachura et al. |
| 2005/0198196 A1* | 9/2005 | Bohn et al. .................... 709/217 |
| 2006/0004806 A1 | 1/2006 | Kraft |
| 2006/0031188 A1 | 2/2006 | Lara et al. |
| 2006/0031447 A1* | 2/2006 | Holt et al. .................... 709/223 |
| 2006/0050862 A1 | 3/2006 | Shen et al. |
| 2006/0069963 A1* | 3/2006 | Miglianico .................... 714/46 |
| 2006/0075294 A1 | 4/2006 | Ma et al. |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1 | 2/2007 | Ramkumar et al. |
| 2007/0074077 A1 | 3/2007 | Markow et al. |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0015186 A1 | 1/2008 | Arnone et al. |
| 2008/0071808 A1* | 3/2008 | Hardt et al. .................... 707/100 |
| 2008/0091466 A1 | 4/2008 | Butler et al. |
| 2008/0209033 A1 | 8/2008 | Ginter et al. |
| 2008/0219563 A1 | 9/2008 | Moroney |
| 2008/0244047 A1 | 10/2008 | Yeung et al. |
| 2008/0320136 A1* | 12/2008 | Holt et al. .................... 709/224 |
| 2009/0006940 A1* | 1/2009 | Hardt .................... 715/224 |
| 2009/0070442 A1 | 3/2009 | Kacin et al. |
| 2009/0132698 A1 | 5/2009 | Barnhill, Jr. |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 | 3/2010 | Wada |
| 2010/0088197 A1 | 4/2010 | Dehaan |
| 2010/0131625 A1 | 5/2010 | DeHaan |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan |
| 2010/0223375 A1 | 9/2010 | DeHaan |
| 2010/0235513 A1* | 9/2010 | Baffier et al. .................... 709/226 |
| 2010/0275064 A1 | 10/2010 | DeCusatis et al. |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055669 A1 | 3/2011 | DeHaan |
| 2011/0055810 A1 | 3/2011 | DeHaan |
| 2011/0078301 A1 | 3/2011 | Dehaan et al. |
| 2011/0107299 A1 | 5/2011 | Dehaan |

* cited by examiner

SYSTEMS AND METHODS FOR INTEGRATED CONSOLE MANAGEMENT INTERFACE

FIELD

The present teachings relate to systems and methods for systems and methods for integrated console management interface, and more particularly to platforms and techniques for generating a portable unified interface permitting interaction with diverse network management consoles from one terminal or location.

BACKGROUND OF RELATED ART

Network management platforms exist which permit a systems administrator to connect to a set of targets in a network, and perform maintenance and diagnostic activities on a variety of managed machines. The network management platform can identify individual targets via a machine hardware ID, security credential, or other means, and identify the software provisioning requirements, obtain a hardware inventory, or perform other management tasks on validated machines. In general, existing network management platforms can be hosted on a central server or other facility that permits connection to, identification, and management of the various sets of targets.

In terms of access to the various sets of targets, each set of targets can be managed via a management console, or control tool which interacts with underlying targets from a supervisory host or other level to access the underlying target machines. In implementations, the management console can provide a dashboard or other graphical view or interface to the resources of the underlying target. For example, the memory, storage, processor, and/or other resources of a target or targets can be exposed and controlled via the management console associated with the target or group of targets.

In different managed networks, the set of management consoles supporting different sets of targets and/or other machines can consist of different software packages, different versions of those software packages, different interfaces, and/or different security or access levels for users who invoke the various management consoles. In existing network implementations, the systems administrator or other user may have to manually recall which set of targets require which management console, and/or hop from terminal to terminal in order to locate or invoke the management console corresponding to a set of attached targets. Thus, there is a need in the art for methods and systems that provide centralized access to management console resources to interact with a set of underlying targets and/or other machines having a diverse set of connection ports and/or console assignments.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for systems and methods for integrated console management interface. More particularly, embodiments relate to platforms and techniques for accessing and coordinating the presentation of network management data via an integrated console management interface. According to embodiments, a console management engine hosted in a network management platform or other resource can communicate with a console translation table storing the types, data formats, and other parameters of a set of console applications used in a managed network environment. According to embodiments in one regard, a systems administrator or other user can access the integrated console management interface to identify one or more target machines with which the user wishes to communicate, for instance to perform network management or maintenance tasks. In embodiments, the user can access the integrated console management interface to collect operational data, review hardware or software inventories, and issue command data to selected targets via the integrated console management interface, regardless of the specific type or version of the management console to which a particular machine is attached. According to embodiments, underlying targets that are managed by multiple or diverse console types can be accessed and managed via the integrated console management interface, since in one regard the console management engine in conjunction with the console translation table can abstract the interface and formats necessary to interact with multiple console types. According to embodiments, the console translation table can be extensible to accommodate new console types and/or other configuration changes in the population of deployed consoles in the managed network. According to embodiments, the integrated console management interface can be hosted, installed, or presented on any available machine in the managed network, including, for instance, desktop or laptop client machines, supervisory hosts or other servers, or other machines. A user of the integrated console management interface can therefore, in one regard, access a desired target machine or machines from an arbitrary machine, and avoid having to relocate to a machine in which a particular console version is installed. The integrated console management interface in such regards therefore acts as a portable abstraction layer for the population of underlying console types. Similarly, a user of the integrated console management interface can access any arbitrary target machine, without having to manually look up or recall which target is associated with which console type.

Reference will now be made in detail to exemplary embodiments of the present teachings, which are illustrated in the accompanying drawings. Where possible the same reference numbers will be used throughout the drawings to refer to the same or like parts.

Figure 1:
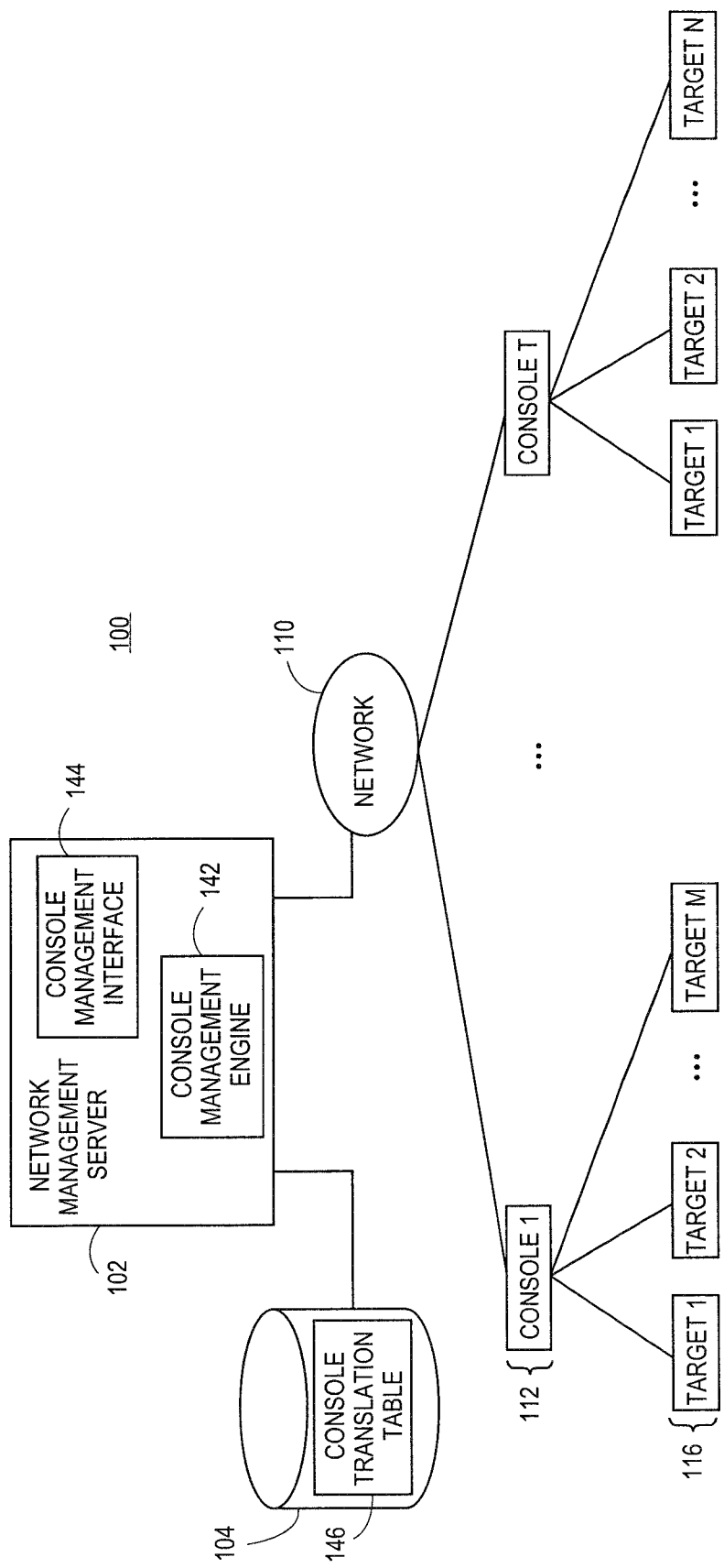
FIG. 1 illustrates an overall network in which systems and methods for systems and methods for integrated console management interface can operate, according to various embodiments of the present teachings.

FIG. 1 illustrates an overall system 100 in which systems and methods for systems and methods for integrated console management interface can be implemented, according to various embodiments of the present teachings. In embodiments as shown, network management platform 102 can communicate with managed network 116 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. Managed network 116 can include, as shown, a set of consoles 112, a set of targets 180, and/or other machines, devices, clients, and/or other hardware, software, storage or other resources.

While secure channel 148 is illustratively shown as one channel to managed network 116 or devices therein, it will be understood that in embodiments, secure channel 148 can comprise multiple channels or connections. In embodiments, secure channel 148 can instead be replaced by a non-secure channel or connection. In general, network management platform 102 can communicate with the managed network 116 and its constituent machines and resources, which can for instance comprise personal computers, servers, network-enable devices, virtual machines, and/or other devices, and manage those machines and their associated resources. The network management platform 102 can host a set of engines, logic, and/or other resources to interact with managed network 116 to identify and interact with any one or more machines in set of targets 180 and/or other hardware-implemented or virtual machines or resources via an integrated console management interface 144.

More particularly network management platform 102 can, in embodiments as shown, host and/or access engines or logic including console management engine 144 and console translation table 146 to initiate sessions with one or more underlying targets using integrated console management interface 144. In embodiments, integrated console management interface 144 can present a graphical user interface or other user interface to permit the exchange of commands and data with set of targets 180, regardless of the type of any console client application or terminal to which an individual machine can be attached. In general, set of targets 180 can be attached to or communicate with any of a diverse set of console management types, versions, or layers. In embodiments, different console types can be configured to operate with specific types of hardware or software that may be present in various machines of set of targets 180.

In embodiments, because in one respect integrated console management interface 144 can communicate with different types of consoles in set of consoles 112, a systems administrator or other user located at network management platform or other location can communicate with any of set of consoles 112 and/or underlying set of targets 180, from one location. It may be noted that while embodiments are illustrated in which integrated network management interface 144 is hosted, present, or accessed via network management platform 102, in embodiment, integrated network management interface 144 can be hosted, presented, or accessed via other machines or resources, including set of consoles 112 and/or set of targets 180, themselves According to embodiments in one regard, the console management engine 142 can generate integrated console management interface 144 by extracting data to access specific console types in set of consoles 112 by performing a lookup in console translation table 146. In embodiments, console translation table 146 can store information associated with individual consoles or sets of consoles in set of consoles 112 and/or underlying target machines, including, for example, hardware specifications, operating system specifications, console application names, versions, or types, communications ports or network connections, or other configuration data related to consoles in set of consoles 112.

Figure 2:
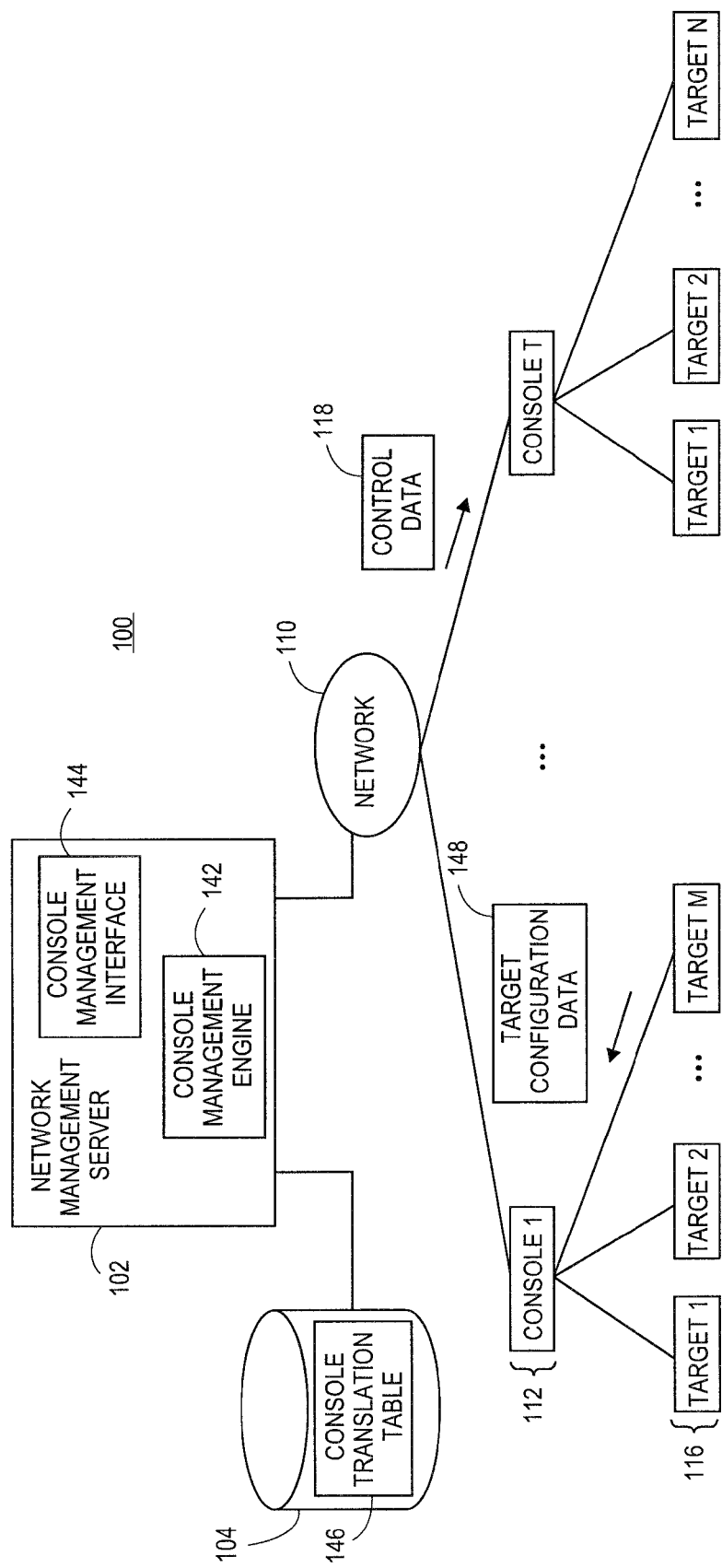
FIG. 2 illustrates an overall network in which systems and methods for systems and methods for integrated console management interface can operate according to various embodiments of the present teachings, including issuance of commands and other features.

As for example more particularly shown in FIG. 2, the console management engine 142 can communicate with set of targets 180 and/or other resources of managed network 116 to communicate with machines that are connected to set of consoles 112. In embodiments, consoles in the set of consoles 112 can comprise dedicated workstations, terminals, or clients, or can comprise applications or other software-based installations. In embodiments, console management engine 142 can communicate with set of targets 180 to collect target configuration data 148 from those machines. Target configuration data 148 can contain information related to the installation and configuration of set of targets 180, such as the type or version of the console to which the machine is attached, hardware data such as a media access control (MAC) address, processor serial number, or other hardware specification or identifier. Target configuration data 148 can likewise comprise an inventory of the operating system and other software complement on a given target, including installed applications. According to embodiments in one regard, console management engine 142 can receive and store some or all of target configuration data 148 to console translation table 146, for instance, in a table having a machine ID key defined by a hardware identifier or other identifiers, and recording the console type to which that particular machine is attached. According to embodiments in one regard, console management engine 142 can access console translation table 146 to identify the format, fields, headers, and/or other configuration or interface data to communicate with individual consoles in set of consoles 112 for a particular target machine. According to embodiments, the systems administrator or other user can access the underlying console via integrated console management interface 144, such as a graphical user interface. According to embodiments, after identification of a corresponding console configuration, console management engine 142 can issue a set of control data 118 via integrated console management interface 144 to the desired target in set of targets 180, for example, to initiate the installation of new software or services, perform maintenance, or carry out security functions on the target. According to embodiments, due to the ability of console management engine 142 to look up, translate, and/or configure data, interfaces and commands for diverse console types, integrated console management interface 144 can function as a portable abstraction layer permitting access to consoles and underlying targets from any given machine or terminal in managed network 116. Network management and maintenance can thereby be made more efficient and flexible, compared to configurations that employ hard-wired console connections and other console implementations.

Figure 3:
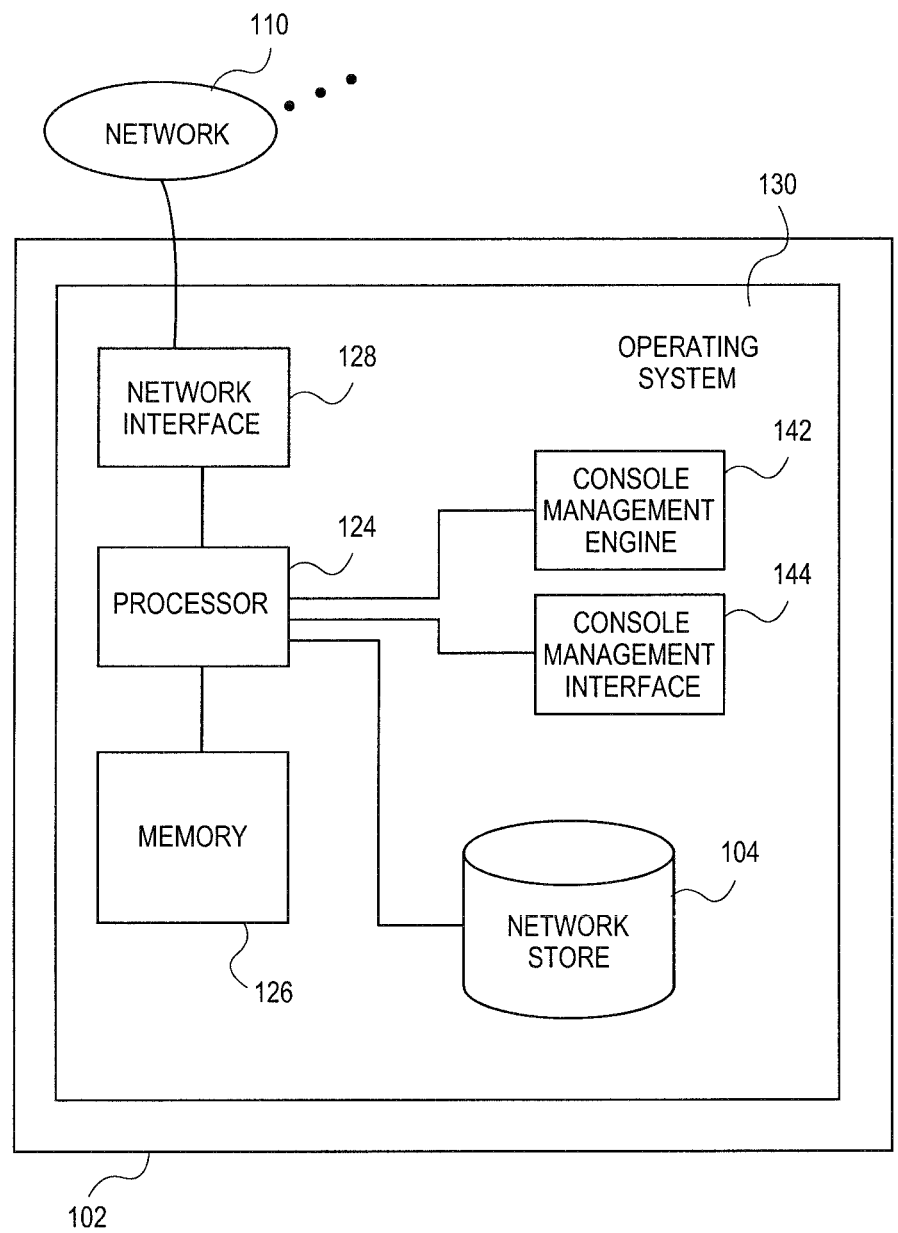
FIG. 3 illustrates an illustrative hardware configuration which can support systems and methods for systems and methods for integrated console management interface according to various embodiments of the present teachings.

FIG. 3 illustrates an exemplary diagram of hardware and other resources that can be incorporated in a network management platform 102 configured to communicate with managed network 116 and/or other resources, according to embodiments. In embodiments as shown, the network management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with console management engine 142, integrated console management interface 144 and/or other resources, to execute control logic and perform console management and configuration processes described herein. Other configurations of the network management platform 102, associated network connections, and other hardware and software resources are possible. While FIG. 3 illustrates network management platform 102 as a standalone system which comprises a combination of hardware and software, network management platform 102 can also be implemented as a software application or program capable of being executed by a conventional computer platform. Likewise, network management platform 102 can also be implemented as a software module or program module capable of being incorporated in other software applications and programs. In either case, network management platform 102 can be implemented in any type of conventional proprietary or open-source computer language.

Figure 4:
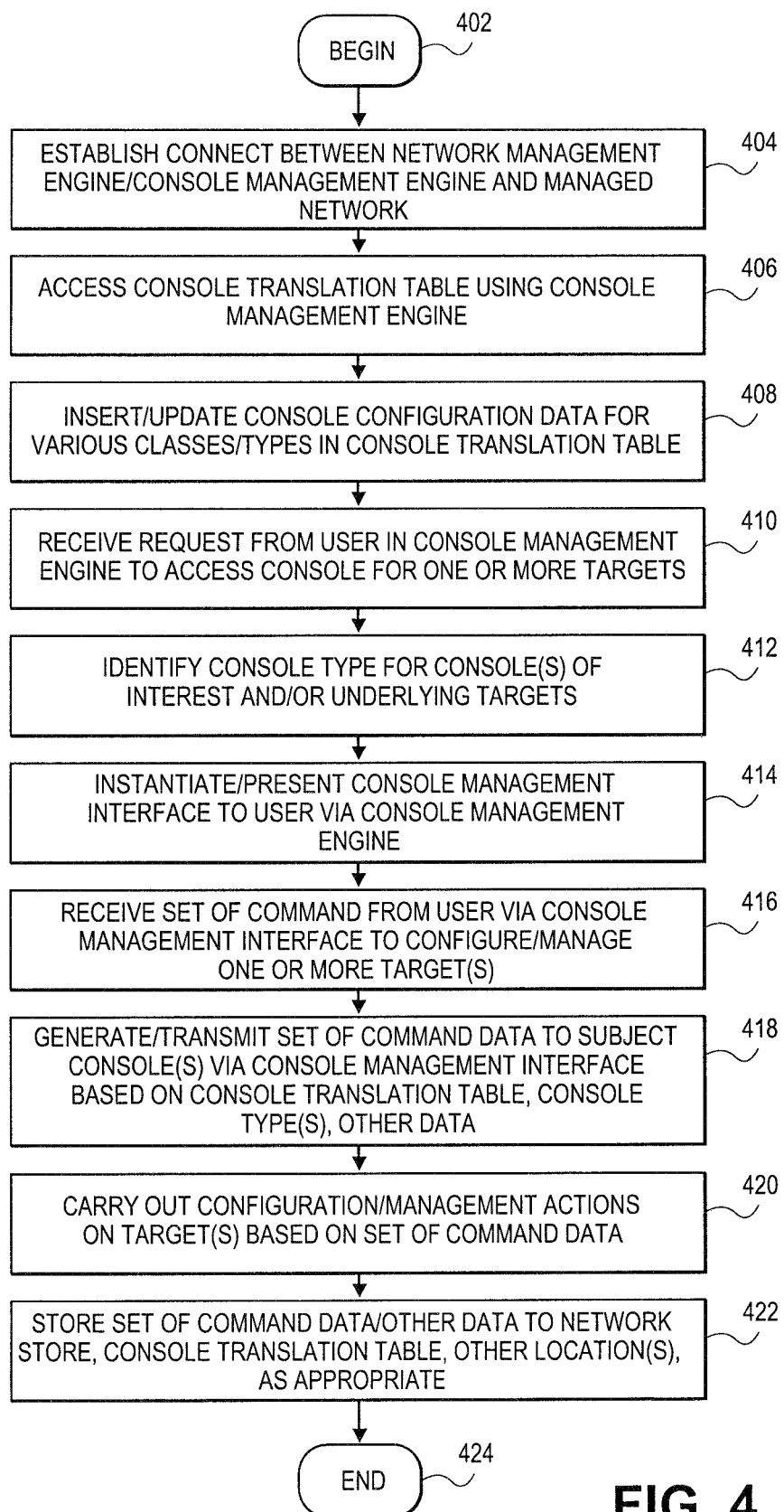
FIG. 4 illustrates a flowchart of processing to integrate a unified management console in a diverse console environment, according to various embodiments of the present teachings.

FIG. 4 illustrates a flowchart of processing to systems and methods for integrated console management interface, according to various embodiments. In 402, processing can begin. In 404, a network management platform 102 including console management engine 142 can establish a connection to a managed network 116. In 408, console management engine 142 can add, insert, or update console class and/or configuration data for various console types or classes in console translation table 146. For instance, the set of console types or classes can include serial-type consoles such as those available from Western Telematic Inc. or others, consoles configured via the "libvirt" virtualization interface for Linux™ and other platforms, the IPMI™ interface available from Dell Computer Corp., or the iLO™ console available from Hewlett-Packard Co. Configuration data associated with different console classes or types can include network addresses, user names or user IDs, passwords, and/or other data needed to access a given console class or type. In 410, console management engine 142 can receive a request from a user to access the console for one or more targets in set of targets 180.

In 412, console management engine 142 can identify a console type for the console or consoles of interest, and/or the underlying target machines attached to those consoles. In 414, console management engine 142 can instantiate or present an integrated console management interface 144 to present to the user. In 416, console management engine 142 can receive a set of command data or inputs from the user via integrated console management interface 144 to effect configuration or management activity on one or more target in set of targets 180. In 418, console management engine can generate and transmit a set of command data 118 to the subject console(s) in set of consoles 112 based on the console translation table 146, identified console type for the console(s) of interest, and/or other data. In 420, the configuration or management actions can be carried out in set of targets 180 based on the set of command data 118. In 422, set of command data 118 and/or other data can be stored to console translation table 146, network store 104, and/or other storage or locations, as appropriate. In 424, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single console management engine 142 manages and maintains console communications within managed network 116, in embodiments, console management logic can be distributed amongst multiple engines, servers, or other entities. Other resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method, comprising:
receiving, from a user via an integrated console interface, a command associated with managing a selected target machine of a set of target machines, wherein the integrated console interface comprises a portable layer providing access to the set of target machines from any of the set of target machines;
initiating a console management session for the selected target machine using the integrated console interface;
accessing a console translation table storing a set of console classes assigned to respective sets of target machines in a network to identify a console class for the selected target machine;
translating, using the console translation table, the command for communication with the identified console class for the selected target machine;
generating, using a hardware processor, the translated command for transmission to the selected target machine; and
storing, in the console translation table, the translated command in association with the identified console class.

2. The method of claim 1, wherein the set of target machines comprises at least one of a set of client machines, a set of virtual machines, or a set of supervisory hosts.

3. The method of claim 1, further comprising:
initiating the console management session using at least one of a network management platform, a supervisory host, or a target machine.

4. The method of claim 1, wherein the translated command comprises at least one of a set of hardware configuration commands, a set of monitoring commands, or a set of software installation commands.

5. The method of claim 1, wherein the console translation table is extensible.

6. The method of claim 1, wherein the translated command comprises a port assignment for communicating with the selected target machine.

7. The method of claim 1, wherein the console management session is initiated for a remote machine external to the network using the integrated console interface.

8. A system comprising:
a memory comprising instructions; and
a hardware processor, coupled to the memory and the interface, the hardware processor to execute the instructions to:
receive, from a user via an integrated console interface, a command associated with managing a selected target machine of a set of target machines, wherein the integrated console interface comprises a portable layer providing access to the set of target machines from any of the set of target machines, initiate a console management session for the selected target machine using the integrated console interface, access a console translation table storing a set of console classes assigned to respective sets of target machines in a network to identify console configuration data associated with a console class for the selected target machine, translate, using the console translation table, the command for communication with the identified console class for the selected target machine, generate, using the hardware processor, the translated command for transmission to the selected target machine; and store, in the console translation table, the translated command in association with the identified console class.

9. The system of claim 8, wherein the set of target machines comprises at least one of a set of client machines, a set of virtual machines, or a set of supervisory hosts.

10. The system of claim 8, the hardware processor to:

initiate the console management session using at least one of a network management platform, a supervisory host, or a target machine.

11. The system of claim 8, wherein the translated command comprises at least one of a set of hardware configuration commands, a set of monitoring commands, or a set of software installation commands.

12. The system of claim 8, wherein the console translation table is extensible.

13. The system of claim 8, wherein the translated command comprises a port assignment for communicating with the selected target machine.

14. The system of claim 8, wherein the console management session is initiated for a remote machine external to the network using the integrated console interface.

* * * * *